United States Patent
Bietry et al.

(10) Patent No.: US 6,438,290 B1
(45) Date of Patent: Aug. 20, 2002

(54) MICRO-ASPHERIC COLLIMATOR LENS

(75) Inventors: Joseph R. Bietry, Rochester; Paul D. Ludington, Brockport; John P. Bowen, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 34 days.

(21) Appl. No.: 09/599,759

(22) Filed: Jun. 22, 2000

(51) Int. Cl.$^7$ .................................................. G02B 6/32
(52) U.S. Cl. .......................................... 385/33; 385/31
(58) Field of Search ............................... 385/11, 23, 27, 385/31, 33, 34, 39, 55, 50, 72, 73, 74, 75, 92, 93, 20, 36, 43, 49, 88, 89, 116

(56) References Cited

U.S. PATENT DOCUMENTS

| | | | |
|---|---|---|---|
| 3,941,474 A | 3/1976 | Kitano et al. | 385/124 |
| 4,246,016 A | 1/1981 | Siegmund | 65/400 |
| 4,420,219 A | 12/1983 | Muchel | |
| 4,421,383 A | 12/1983 | Carlsen | 385/79 |
| 4,868,361 A | 9/1989 | Chande et al. | |
| 4,893,890 A | 1/1990 | Lutes | |
| 4,925,267 A | 5/1990 | Plummer et al. | |
| 5,301,249 A | 4/1994 | Hamblen et al. | 385/31 |
| 5,926,593 A * | 7/1999 | Asami et al. | 385/34 |
| 5,943,454 A * | 8/1999 | Aksyuk et al. | 385/22 |
| 5,956,441 A * | 9/1999 | Fairchild et al. | 385/27 |
| 6,044,056 A * | 3/2000 | Wilde | 369/119 |
| 6,088,153 A * | 7/2000 | Anthon | 359/341 |
| 6,282,347 B1 * | 8/2001 | Ono et al. | 385/74 |
| 6,289,152 B1 * | 9/2001 | Zhang | 385/33 |
| 6,320,993 B1 * | 11/2001 | Laor | 385/16 |

FOREIGN PATENT DOCUMENTS

| | | |
|---|---|---|
| DE | 38 30 119 A | 3/1990 |
| EP | 0 798 582 A | 10/1997 |

OTHER PUBLICATIONS

R.E. Wagner and W.J. Tomlinson, "Coupling efficiency of optics in single–mode fiber components", Aug. 1, 1982, vol. 21, No. 15, pp. 2671–2688 of Applied Optics.

* cited by examiner

*Primary Examiner*—Brian Healy
*Assistant Examiner*—Kevin S Wood
(74) *Attorney, Agent, or Firm*—Milton S. Sales (57) ABSTRACT

Apparatus for coupling light from one optical fiber into another includes a pair of molded plano-convex lenses. Each lens has an aspheric surface and a flat surface. The aspheric surfaces have a conic constant between −0.6 and −0.3, where the conic constant is chosen so as to give optimal coupling efficiency from a collimated beam input on the aspheric surface into an optical fiber located near the flat surface. The pair of lenses are separated by a distance approximately equal to the sum of the focal lengths of the lenses. Light from an optical fiber placed near the focal plane of one of the pair of lenses is focused into an optical fiber placed near the focal plane of the other of the pair of lenses.

5 Claims, 5 Drawing Sheets

MICRO-ASPHERIC COLLIMATOR LENS

FIELD OF THE INVENTION

This invention relates to methods of and apparatus for connecting optical fibers. In particular, it relates to lenses to couple light from one fiber into another, and to the design of such lenses so as to permit improved packaging of optical fibers, lenses, and related components.

BACKGROUND OF THE INVENTION

In optical fiber applications, it is often necessary to couple light from one fiber into another. This might be done at a switching facility where multiple fibers are brought together. A known way to do this is by directly butting the fibers together. The fibers can also be joined by electrical fusion. In this method, an electric arc is used to heat the end of the two fibers as they are brought into contact. The arc melts the fibers, causing them to join in a permanent and mechanically stable joint. It is also possible to use lenses to couple the light from one fiber into another, as described in U.S. Pat. No. 4,421,383, which describes lenses and a physical connector that holds the fiber and lenses in appropriate positions.

In many applications, it is desirable to perform processing or manipulation of the light after the light exits the source fiber and before it enters the receiving fiber. Examples of this processing include attenuation and filtering. In optical communication systems that utilize multiple wavelengths on one fiber, referred to as wavelength division multiplexing, an erbium-doped fiber amplifier is used to optically amplify the optical signal in the fiber over a broad wavelength range. Since each wavelength in a wavelength division multiplexed system comes from a different source, the signal power at each wavelength may need to be adjusted for optimum operation of the optical amplifier. The adjustment of the signal power requires variable optical attenuation of the optical signal, and this attenuation is often most easily performed on an expanded beam.

Figure 1:
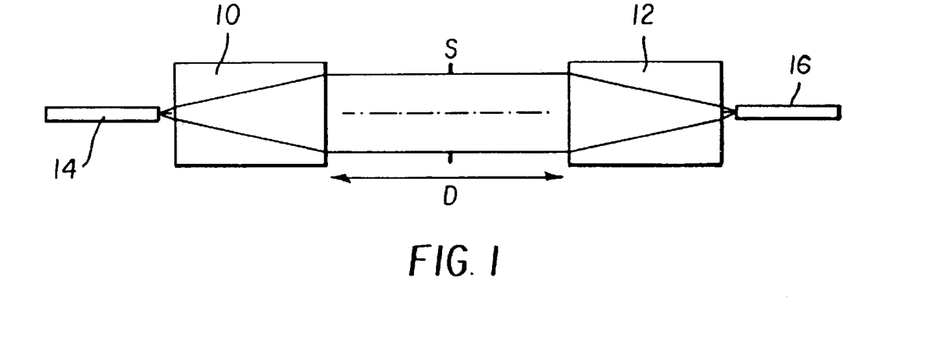
FIG. 1 shows a pair of collimating lenses being used to couple light from a source fiber into a receiving fiber.
Figure 2:
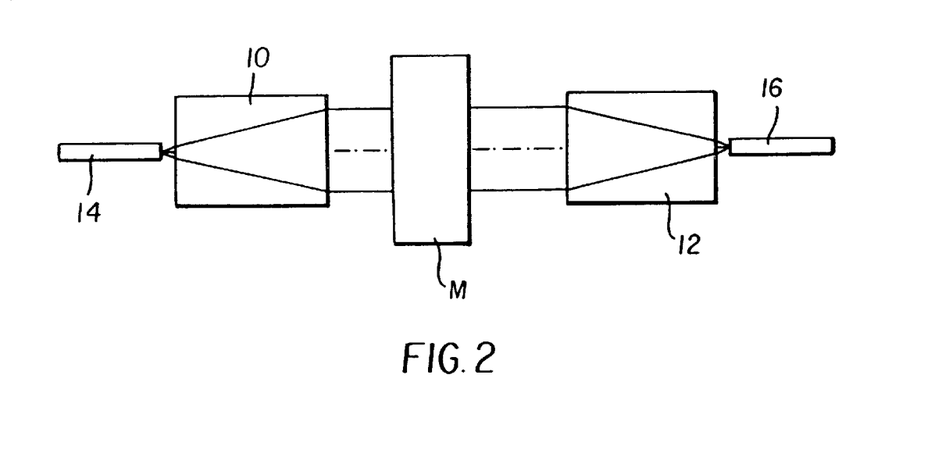
FIG. 2 shows optical components introduced into the collimated beam in order to provide additional processing.

Processing of the optical signal between fibers is most easily performed if the optical beam from the fiber has been expanded and collimated. FIG. 1 shows an example of a pair of conventional collimating lenses 10 and 12 being used to couple light from a source fiber 14 into a receiving fiber 16. It is known in the art that gradient index lenses are commonly used for this application. Gradient index lenses are made by diffusing a dopant into a cylindrical glass body. The dopant produces a radial gradient in the refractive index of the lens. If the refractive index is less towards the periphery of the lens, then the lens will focus light from a distant source. The shape of the refractive index profile controls the imaging properties of the lens. After diffusion, the lenses are cut to a specific length and the ends are polished. When the light is collimated between the lenses, the beam stays nearly the same size over an appreciable distance "D" (typically 10's of millimeters). Since the beam is nearly the same size in this space, it is easier to put additional optical components that either attenuate or filter the beam, such as for example optical modulator "M" shown in FIG. 2.

In systems involving the processing of optical signals, it is desirable to maintain as much signal power as possible when coupling the optical signal from one fiber to another. For the case of single mode optical fiber, the coupling efficiency can be computed by analytical methods. (See R. E. Wagner and J. Tomlinson, "Coupling efficiency of optics in single-mode fiber components," Applied Optics, vol. 21, No. 15, 1982, pg 2671). For the case of coupling light from one fiber to the other, the lenses must be of a specific optical function in order to produce high coupling efficiency. Second collimating lens 12 produces a focused beam that is directed towards receiving fiber 16. The percentage of light coupled into the receiving fiber will be reduced by any aberrations in the focused beam. Loss of optical power in a fiber system is highly undesirable, as it can limit the amount of information that can be transferred over a communication channel.

Figure 3:
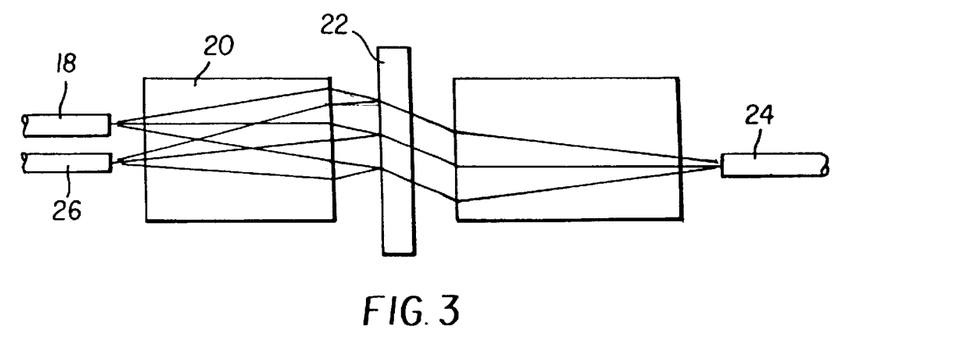
FIG. 3 shows an optical system with a filter to separate out light of different wavelengths.

Recently, more optical fiber based communication systems utilize multiple wavelengths at one time in order to increase the quantity of information carried. The general concept of using multiple wavelengths is referred to as wavelength division multiplexing. Wavelength division multiplexing systems require a method to separate out signals of different wavelengths present in the optical fiber. This can be done by a method as shown in FIG. 3. A source fiber 18 is located near the front focal plane of a collimating lens 20. Light from the source fiber is collimated by collimating lens 20 and directed at an optical filter 22. A coating of the optical filter is constructed to reflect all light except that light in a very narrow wavelength band centered around a desired wavelength. Light that passes through filter 22 is coupled into a receiving fiber 24. If filter 22 is aligned correctly, light reflected from the filter will be directed onto the end of a second receiving fiber 26. Note that fibers 18, 24, and 26 are located off the optical axis of the system.

Figure 4:
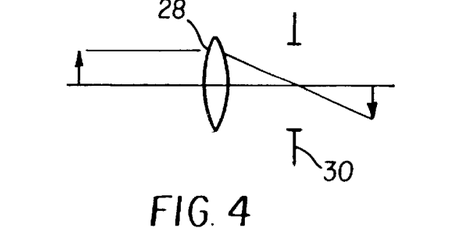
FIG. 4 shows a system telecentric in object space.
Figure 5:
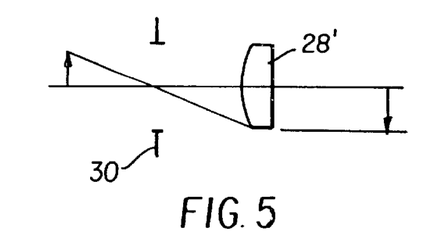
FIG. 5 shows a system telecentric in image space.

To achieve high coupling efficiency of a beam into an optical fiber, it is not sufficient that the beam be focused onto the fiber with a low amount of aberration. More specifically, the focused beam must match the fundamental mode of the fiber. This requires that the beam be of the same amplitude and phase of the fiber mode. To match the phase distribution of the fiber, the beam should enter the fiber along the optical axis of the fiber, or additional loss will result. If we assume that the end face of the fiber is perpendicular to the optical axis of the fiber, then the beam must be perpendicular to the fiber for the highest coupling efficiency. For a normal imaging system, the condition of a beam being parallel to an axis of the system is referred to as telecentricity. More specifically, telecentricity in a normal imaging system requires that the chief ray, which is the ray traveling through the center of the stop, be parallel to the optical axis at some point in the system. An optical system may be telecentric at different portions of the optical system. If the chief ray is parallel to the optical axis in object space, one would consider the system to be telecentric in object space. If the chief ray is parallel to the optical axis in image space, one would consider the system to be telecentric in image space. For example, FIG. 4 shows a simplified system of a lens 28 and a stop 30 wherein the system is telecentric in object space. FIG. 5 shows a similar system of a lens 28' and a stop 30' that is telecentric in image space.

Due to the nature of the fiber source, the beam coming from an optical fiber would normally be considered to be telecentric in object space, as that beam emerges from the fiber parallel to the optical axis. It is a desirable feature of the optical system for coupling fibers that the light is also telecentric in image space, in order to achieve the highest coupling efficiency of light into the receiving fiber, which is located in image space. If the light enters the optical fiber at a substantial angle to the axis of the optical fiber, then the coupling efficiency of the beam into the fiber will be significantly reduced. Although it may be possible to tilt fibers from the optical axis in order to reduce the effective angle between a beam and the optical axis of the fiber, tilting fibers can greatly increase the time and cost of assembling the final optical system. The conditions of telecentricity are affected by the location and type of the optical elements, and the location of the stop.

For systems used to couple light from one fiber to another, it is not desirable to have any apertures that limit the beam and thereby reduce optical power. Hence there is often no defined aperture or stop limiting the beam. When there is no physical aperture limiting the beam, telecentricity is determined by the characteristics of the source and receivers in combination with the optical elements. More specifically, if a beam is propagating in the system and it is undesirable to introduce any aperture that would limit the optical beam in any way, then the location of the stop is usually described by the location of where the chief ray crosses the optical axis of the system. The chief ray is defined to be the ray in the center of the beam distribution that is emitted from the source, and hence is not determined by physical apertures in the optical system.

It is known in the art that gradient index lenses can be used to collimate light from optical fibers. Such lenses are made by Nippon Sheet Glass, Somerset, N.J. When a gradient index lens is of a length such that light emitted from a point source on one face is collimated, then the lens is referred to as a quarter-pitch lens.

Figure 6:
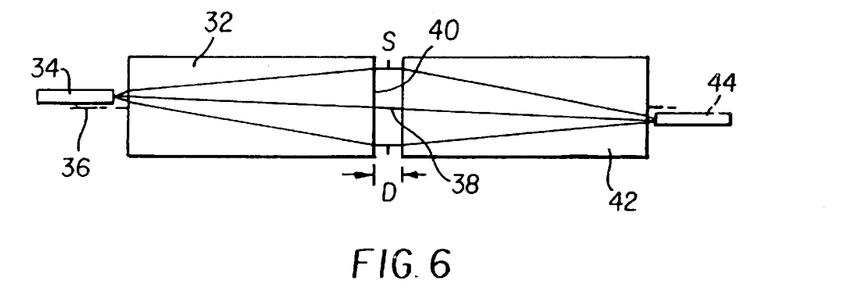
FIG. 6 shows a quarter-pitch grin rod lens.
Figure 7:
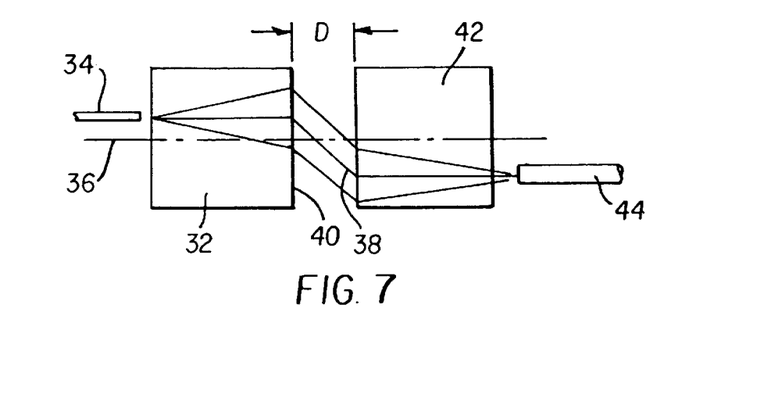
FIG. 7 shows a pair of quarter-pitch rod lenses, with the second lens displaced from the first.

A significant disadvantage of gradient index lenses is shown in FIG. 6. Here a quarter-pitch rod lens 32 is shown collimating the light from a fiber 34. If the fiber is placed off the optical axis 36 of the system, as shown in the figure, then the chief ray 38 (represented by the ray that is emitted perpendicularly to the fiber face) crosses the optical axis at the exit face 40 of quarter pitch rod lens 32. In order to focus this beam on a fiber and produce high coupling efficiency, a second quarter pitch rod lens 42 must be placed in close proximity to exit face 40 of first quarter pitch rod lens 32. In this way, the chief ray emerging from second quarter pitch rod lens 42 will be nearly parallel to the optical axis of the lens and of a receiving fiber 44 after emerging from the second lens 42, thus ensuring high coupling efficiency. If the second quarter pitch rod lens is displaced longitudinally from the first quarter pitch rod lens, as shown in FIG. 7, the chief ray will not be parallel to the axis of the receiving fiber after the chief ray emerges from the lens.

If gradient index lenses are used for the lenses in FIG. 3, the filter requires that the lenses be separated. This in turn means that the chief ray will not emerge from the receiving lens parallel to the optical axis, or in terms previously described, the system is not telecentric in image space. The lack of telecentricity means that the optical system will have higher loss, unless the fibers are realigned to account for the lack of telecentricity.

Figure 8:
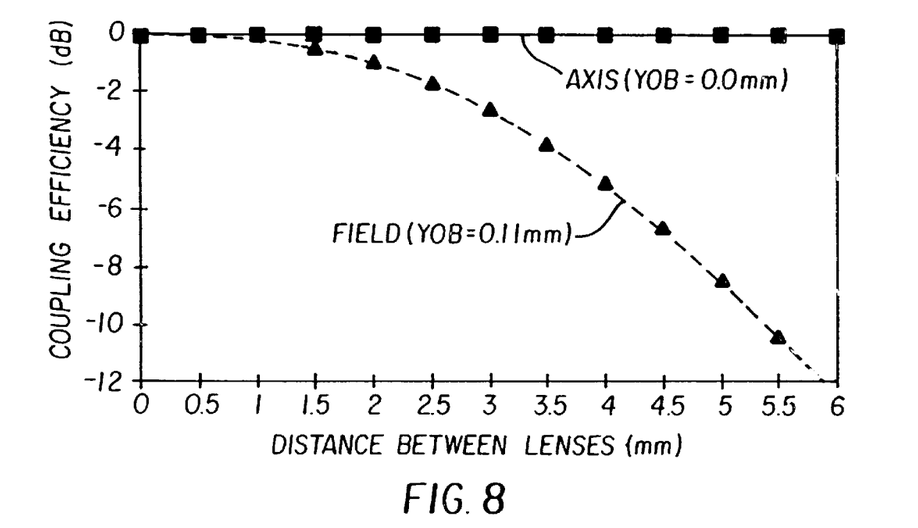
FIG. 8 shows the theoretical coupling efficiency as a function of lens separation (D) for a pair of gradient-index rod lenses.

An example of a commercially available gradient index lens is SLW18 by Nippon Sheet Glass. FIG. 8 shows the theoretical coupling efficiency as a function of lens separation (D) for the NSG SLW lens pair. This example assumes that the fibers are spaced 100 microns from the optical axis, and operating at a wavelength of 1.56 microns. Note that the off-axis coupling efficiency drops dramatically as the separation between the two lenses increases.

In order to have high coupling efficiency, the focusing lens must not introduce significant aberrations into the beam. For a gradient index lens, the shape of the refractive index profile must be tailored exactly to produce minimal aberrations. The control of the refractive index profile is difficult, since the shape of the profile is controlled by only by diffusion of the dopant into the glass.

It is a further disadvantage of gradient index lenses that one of the dopants commonly used in the diffusion is thallium. For example, the use of thallium in gradient index lenses is described in U.S. Pat. Nos. 3,941,474 and 4,246,016. Thallium is a toxic metal (even more toxic than lead).

In addition to gradient index glass lenses, previous workers have used refractive lenses to couple light between fibers, as mentioned in U.S. Pat. 4,421,383. However, U.S. Pat. No. 4,421,383 does not describe the use of aspheric surfaces to improve optical performance, and does not discuss the conditions needed to improve off-axis coupling efficiency between off-axis fibers. U.S. Pat. No. 5,301,249 (Hamblen et al) describes the use of mirrored systems to couple light from a laser diode into a fiber. However, this patent does not quantitatively describe expected single-mode coupling efficiencies, nor does it describe off-axis performance of the system

DISCLOSURE OF THE INVENTION

It is an objective of the present invention to provide a prescription for lenses that produce high coupling efficiency between optical fibers.

It is another object of the present invention to allow high efficiency of coupling light from one fiber to a second single mode receiving fiber.

It is still another object of the present invention to allow high coupling efficiency between single mode fibers even when the optical fibers are located away from the optical axis of the lens.

According to a feature of the present invention, the lens uses a refractive molded convex shape on one surface and a flat surface on the other. All of the optical power of the lens is concentrated on the one convex surface. As discussed below, this has significant advantages when the lenses are used in pairs to couple light between fibers.

In another feature of the invention, the convex surfaces can be aspheric surfaces, where the amount of asphericity is controlled in order to minimize aberrations for beams passing through the lens.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. In the discussion, we will assume that we are using single-mode optical fibers, although those trained in the art will realize the advantages of the present invention apply to use of the invention with multi-mode fibers.

Figure 9:
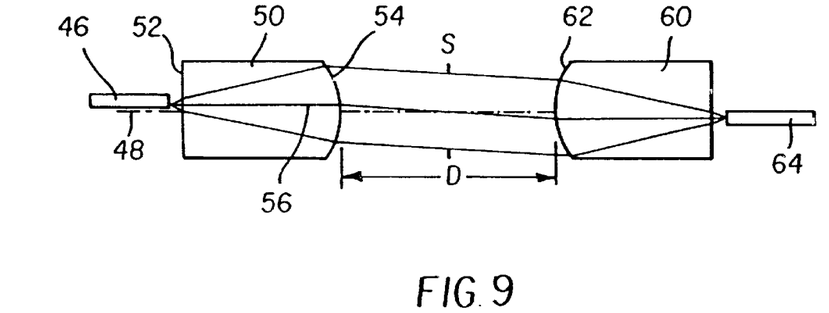
FIG. 9 shows two lenses combined to couple light from one fiber into a second fiber.

Referring to FIG. 9, an optical fiber 46 is mounted away from the optical axis 48 of a cylindrical lens 50. Since the outer diameter of the lens is less than its length, it is easier to mount the lens in a v-groove or a cylindrical housing. A first surface 52 of the lens is flat in order to make manufacturing easier. The second surface 54 of the lens provides refractive power, and is a convex shape.

Lens 50 is different from gradient index lens in that the chief ray 56 is not refracted until second surface 54. Therefore, there is an appreciable distance between second surface 54 and the position whereat chief ray 56 crosses optical axis 48. A stop "S" is located where the chief ray crosses the axis. For this lens, the stop is one focal length away from the lens. Since all of the optical power is at the aspheric surface, the spacing between the lens and its aperture stop for the telecentric condition is maximized.

Furthermore, the separation of the lenses will improve the coupling efficiency for off-axis fibers over the case where the lenses are separated by a distance substantially less than the sum of the focal lengths, as is the case for U.S. Pat. No. 4,421,383.

A second lens 60 is located one focal distance from stop "S". After refraction by the first surface 62 of the second lens, the chief ray emerges from the second lens parallel to the optical axis. Since the chief ray is parallel to the optical axis, the optical system is now telecentric in image space and it is possible to achieve high coupling efficiency into a single mode fiber, even if the fibers are located off of the optical axis of the system. The distance "D" between the two lenses in FIG. 9 is equal to the sum of their focal lengths. If the source and receiving fiber have the same mode field diameter (as is usually the case) then it is desirable to have a magnification of −1.0 between source fiber 46 and a receiving fiber 64. The magnitude of the magnification is equal to the ratio of the focal length of the first lens to the focal length of the second lens, so, in the configuration of FIG. 9, it is desirable to have both lenses with identical focal lengths.

As discussed in R. Kinslake's "Lens Design Fundamentals," Academic Press, 1978, pg. 37, convex surface of the lens in FIG. 9 can be chosen to have an aspheric shape order to minimize the aberration of the beam produced by the lens. The shape is commonly specified in the form of a conic equation, where the sag of the surface is given by $$sag = \frac{\frac{y^2}{R}}{1 + \sqrt{1 - (1+k)\frac{y^2}{R^2}}}$$

where R is the base radius of the surface, y is the radial coordinate, and k is the conic constant. If k=0, the surface is a sphere. For this lens (discussed in further detail in Example 1), the design parameters are:

R=1.31 k=−0.444.

Equivalent mathematical formulas can be used to describe the same optical surface shape, without changing the effective function of the surface.

Figure 10:
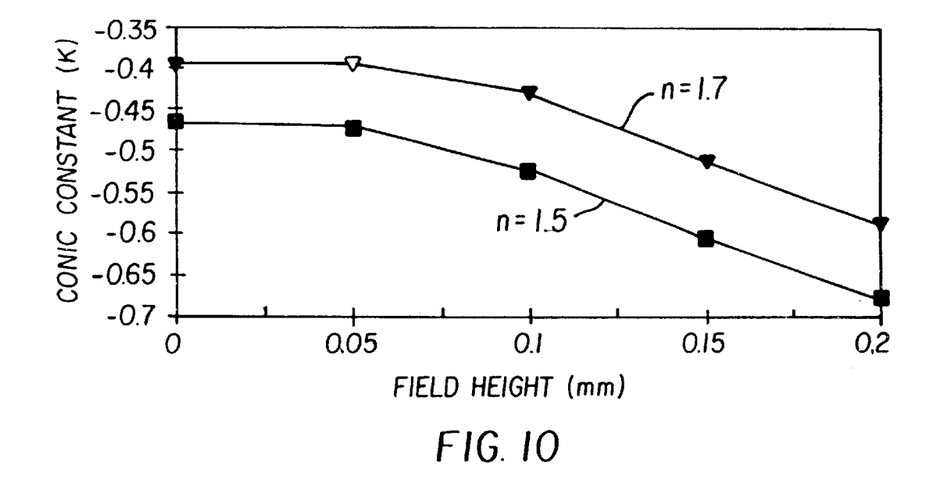
FIG. 10 shows the optimal choice of conic constant k as a function of the off-axis fiber distance.

For an on-axis object, the particular shape of asphere can be chosen in order to drive all orders of spherical aberration to zero. As is known, an ellipsoidal surface will produce an image of an infinite object without any spherical aberration. The conic constant is given by $(-1/n)^2$, where n is the refractive index of the lens. (See Kingslake, p. 113). However, the ellipsoid will give perfect imaging only for points imaged on the optical axis. In order to determine the best overall performance, considering the lens must function for both on-axis and off-axis points, the conic constant must be changed in order to achieve the best overall performance. FIG. 10 shows the variation of the conic constant as a function of the size of the field. As can be seen from the figure, the optimal conic constants for a non-zero field (say 0.2 mm) are substantially different (by 50%) from the optimal conic constant for the on-axis case. The optimal value of the conic constant was selected by minimizing the average rms optical path difference of the on-axis and off-axis field points. The focal length is 1.94 mm; all other first order properties were maintained. Note that as the refractive index of the lens material increases, the conic constant decreases in magnitude (or is closer to zero). A conic constant closer to zero means that less aspheric departure is required in order to produce the optimal wavefront. Lower aspheric departure means that fabrication is easier, since as is well known in the art, the difficulty of manufacturing increases with increasing aspherical departure.

The spacing between the lenses (designated D in FIG. 9) while maintaining a telecentric beam in image space is substantially increased for off axis conditions because the first principal plane (designated P.P.1) for the second lens is at the refractive surface, and the front focal distance is equal to the front focal length. This system offers much greater working distance between the lenses while still maintaining very high coupling efficiency, as compared to the pair of gradient index lenses shown in FIG. 8. In contrast, the first principal plane for the gradient index lenses is buried within the lens, and hence the front focal distance is much less than the front focal length.

Figure 11:
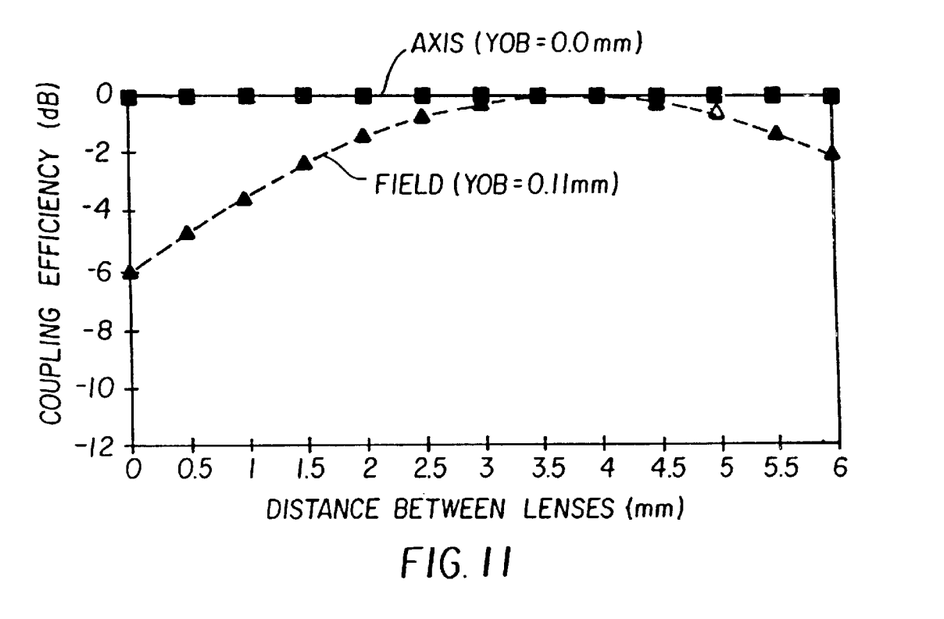
FIG. 11 shows the theoretical coupling efficiency for off-axis fibers as a function of lens separation (D) for the lenses discussed in this invention, when those lenses are used as a pair.

FIG. 11 shows the theoretical coupling efficiency for off-axis fibers as a function of lens separation "D" for the lens discussed herein, when those lenses are used as a pair. In this case, the off-axis coupling efficiency is at a peak for relatively large amounts of separation between the two lenses increase. This feature of the invention allows components to be easily inserted between the lenses, while maintaining high coupling efficiency.

The lens could be made of either glass or molded plastic. Glass has greater environmental stability than plastic.

Unlike plastic lenses, glass will not change refractive index due to chemical changes or humidity. It is desirable that the homogeneity of the lens material be maintained during the molding process. As is known in the industry, inhomogeneity of the optical material can adversely affect the performance of the lens. It is an advantage of the lens, as compared to gradient index lenses made by diffusion, that no toxic metals such as thallium are used for the diffusion.

It is an advantage of the invention proposed here that higher index glasses can be chosen for the lens. A higher index lens reduces the strength of the curves needed to provide a given refracting power, hence making manufacturing easier. It is a further advantage that for a higher index material, a single layer optical coating can cause a significant reduction in the amount of light reflected from the lens surface. This is because the optimal choice for the index of a single-layer antireflection coating is equal to the geometric mean of the refractive indices of the two media on each side of the coating. One of the common coating materials is magnesium fluoride, with a refractive index of 1.38. Hence magnesium fluoride is optimal for a substrate index of 1.90. The closer the substrate refractive index is to 1.90, the better the performance of the single-layer magnesium fluoride coating.

Figure 12:
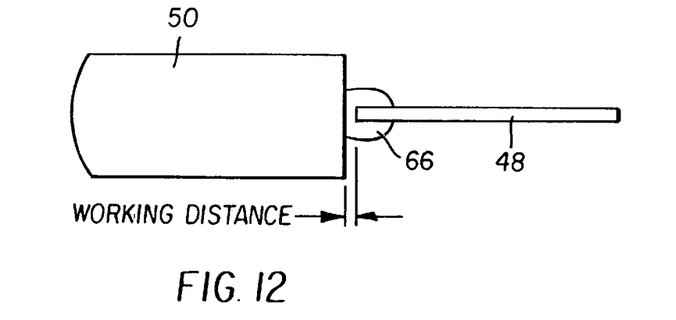
FIG. 12 shows a fiber attached to the back of a lens.
Figure 13:
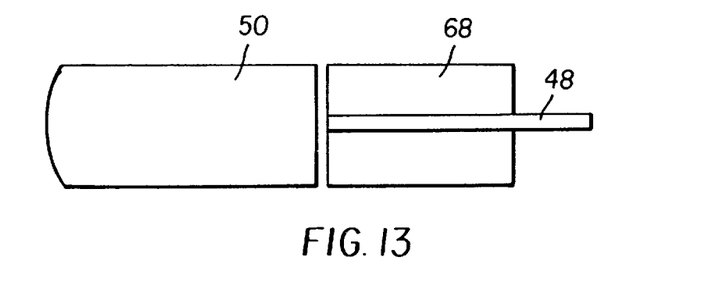
FIG. 13 shows a fiber in a ferrule, placed near the back of a lens.

The overall length of the lens is chosen to be such that the optical fiber is near the flat surface of the lens. This makes it easier to physically hold the fiber against the back of the lens. Referring to FIG. 12, a method to hold fiber 46 in place at the flat surface of lens 50 is to use an adhesive 66 that can be cured by heat or ultraviolet radiation. For some manufacturing methods, the ability to place the fiber against the back of the lens can reduce manufacturing cost. As shown in FIG. 13, fiber 48 can also be held in a ferrule 68 and placed near the back of lens 50. This ferrule can then be held in place with adhesive. It is also possible to mold a small recess on the back of the lens, the fiber can then be held in the recess with adhesive.

Figure 14:
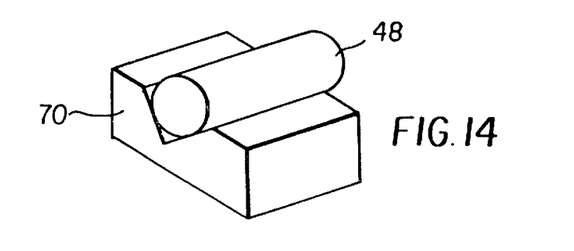
FIG. 14 shows a lens in a v-groove.

Referring to FIG. 14, since length of lens 48 is significantly greater than the diameter, it is easier to hold a lens with a high length to diameter ratio in a cylindrical holder (tube) or a V-groove 70, and to maintain alignment of the optical axis of the lens with the mechanical axis of the mounting surfaces.

Figure 15:
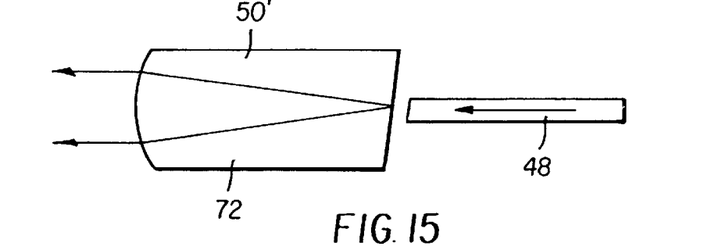
FIG. 15 shows the lens with a plane surface and an aspheric surface, and the plane surface set at an angle with respect to the aspheric axis of the aspheric surface.

Another advantage is achieved with the plano surface angled as shown in FIG. 15. In this case an angled facet 72 on the lens will reduce back reflections from source fiber 48 back into itself. This is an important consideration when using the lens in communication systems, where back reflections can cause a decrease in the signal-to-noise ratio. In the industry, it is common to cleave or polish the end of the fiber at an angle of 8 degrees. Light reflected from the end of the fiber will then not propagate back down the fiber. Light transmitted from the fiber is deviated by the wedge on the end of the fiber. It is known that the amount of deviation θ is given approximately by $$\theta = (n-1)\alpha$$

where n is the refractive index of the material and α is the wedge angle. A compensating wedge of a similar angle is typically put on the back of collimating lenses, as shown in FIG. 15. The compensating wedge on the back of the lens returns the chief ray to a condition where it is nearly parallel to the optical axis.

An example of a glass that may be used for molding is Hoya Tac-4, which has an index of about 1.74. It is common in the industry that the fibers are cleaved with an angle of about 8 degrees on the end. Since the fiber is primarily fused silica with an index of 1.475, the angle of deviation of the light traveling through the wedge on the end of the fiber is about 0.067 radians. To compensate for this angular deviation, the wedge on the back of a lens made of Tac-4 should be 5.46 degrees.

It is known that placing a wedged surface in a focused beam will introduce aberrations, including astigmatism. Astigmatism in a beam will reduce the single mode coupling efficiency. The angle computed above for the wedge angle of the Tac-4 lens may be changed in order to reduced the total amount of astigmatism in the final image. An angle of 5–6 degrees will reduce the total amount of astigmatism as compared to an 8 degree wedge on collimators previously known in the industry.

The following examples give specific embodiments of the invention, and is not intended to limit the invention to specific dimensions.

EXAMPLE 1

A particular lens design that is an example of the proposed invention is given below. The design utilizes two identical plano convex lenses. For these lenses, the convex surfaces are specified to be aspheres.

Curvature of convex surfaces 1: 0.7634 mm$^{-1}$

Conic constant of convex aspheric surfaces: K=−0.444

Lens thickness: 2.960 mm.

Glass: Hoya TAC-4

Refractive index at 1550 nm: 1.70

Working distance between fiber and lens: 0.22 mm

Effective focal length of individual lens: 1.9 mm

Angle between normal of plano surface and the aspheric axis of the convex surface: 0.0 degrees.

Specified entrance pupil diameter: 1.35 mm on the convex surface.

Composite rms wavefront error: 0.024 waves.

For this optical system, the angle of the chief ray as a function of the lens separation is shown in the following table:

| Distance between lenses, mm | Tangent of angle on receiving fiber, at 0.1 mm field |
| --- | --- |
| 3.84 | 0.00 |
| 3.6 | 0.007 |
| 2.8 | 0.028 |
| 2.4 | 0.039 |
| 2.0 | 0.049 |
| 1.6 | 0.060 |
| 1.2 | 0.0712 |
| 0.8 | 0.082 |
| 0.4 | 0.092 |
| 0.0 | 0.102 |

For this lens, if the lens are separated by 0.4 mm, the beam from the source fiber will be incident on the receiving fiber at an angle of 5.2 degrees, leading to a significant amount of loss.

EXAMPLE 2

Example 2 uses two identical plano convex aspheres. The plano facet is tilted with respect to the optical axis of the asphere. The amount of tilt is set equal to 8 degrees, which is a common cleave angle used for optical fibers.

Curvature of convex surface: 0.7634 mm$^{-1}$.

Conic constant of aspheric surface: K=−0.444

Lens thickness: 2.960 mm.

Glass: Hoya TAC-4

Refractive index at 1550 nm: 1.70

Working distance between fiber and lens: 0.22 mm

Effective focal length: 1.9 mm

NA: 0.35

Angle between normal of plano surface and aspheric axis of convex surface:8 degrees.

Composite rms wavefront error: 0.045 waves.

EXAMPLE 3

Example 3 is identical to Example 2, except that the facet angle of the plano lenses has been optimized to reduce the overall aberration. Specifically, the angle of the plano facet is 5.348 degrees with respect to the aspheric axis of the lens. We see that the composite rms wavefront error is reduced by 15%.

Curvature of convex surface: 0.7634 mm$^{-1}$.

Conic constant of aspheric surface: K=−0.444

Lens thickness: 2.960 mm.

Glass: Hoya TAC-4

Refractive index at 1550 nm: 1.70

Working distance between fiber and lens: 0.22 mm

Effective focal length: 1.9 mm

NA: 0.35

Angle between normal of plano surface and aspheric axis of convex surface: 5.348 degrees.

Composite rms wavefront error: 0.038 waves.

EXAMPLE 4

Example 4 uses a glass with a very low melting temperature. The low melting temperature of the glass makes it possible to mold this glass with a greater variety of mold materials.

Curvature of convex surface: 0.878 mm$^{-1}$.

Conic constant of aspheric surface: K=−0.4696

Lens thickness: 2.722 mm.

Glass: Corning Co-550

Refractive index at 1550 nm: 1.585

Working distance between fiber and lens: 0.24 mm

Effective focal length: 1.9 mm

NA: 0.35

Angle between normal of plano surface and aspheric axis of convex surface:0 degrees.

Composite rms wavefront error: 0.020 waves.

The invention has been described in detail with particular reference to preferred embodiments thereof, but it will be understood that variations and modifications can be effected within the spirit and scope of the invention.

What is claimed is:

1. A molded plano-convex lens with an aspheric surface and a flat surface, and the aspheric surface having a conic constant between −0.6 and −0.3, where the conic constant is chosen so as to give optimal coupling efficiency from a collimated beam input on the aspheric surface into an optical fiber located near the flat surface.

2. A pair of lenses each with a positive focal length and a focal plane, wherein:

the pair of lenses are separated by a distance approximately equal to the sum of the focal lengths of the lenses;

light from an optical fiber placed near the focal plane of one of the pair of lenses is focused into an optical fiber placed near the focal plane of the other of the pair of lenses; and each of the lenses are molded plano-convex with an aspheric surface and a flat surface, and the aspheric surface having a conic constant between −0.6 and −0.3, where the conic constant is chosen so as to give optimal coupling efficiency from a collimated beam input on the aspheric surface into an optical fiber located near the flat surface.

3. A pair of lenses, each as described in claim 2, wherein:

the lens pair has a common optical axis; and the pair are used to couple light from fibers placed at a substantial distance from the optical axis of the lenses.

4. A molded plano-convex lens having a convex surface and a plano surface, wherein the working distance from the plano surface to an image plane is controlled to less than 0.020 mm.

5. A molded plano-convex lens with an aspheric surface and a flat surface, and the aspheric surface having a conic constant between −0.6 and −0.3, where the conic constant is chosen so as to give optimal coupling efficiency from a collimated beam input on the aspheric surface into an optical fiber located near the flat surface, wherein the outer surface of the lens is a cylinder and the axis of the cylinder is nearly coincident with the optical axis of the aspheric surface to within 0.010 mm.

* * * * *